Figure 1:
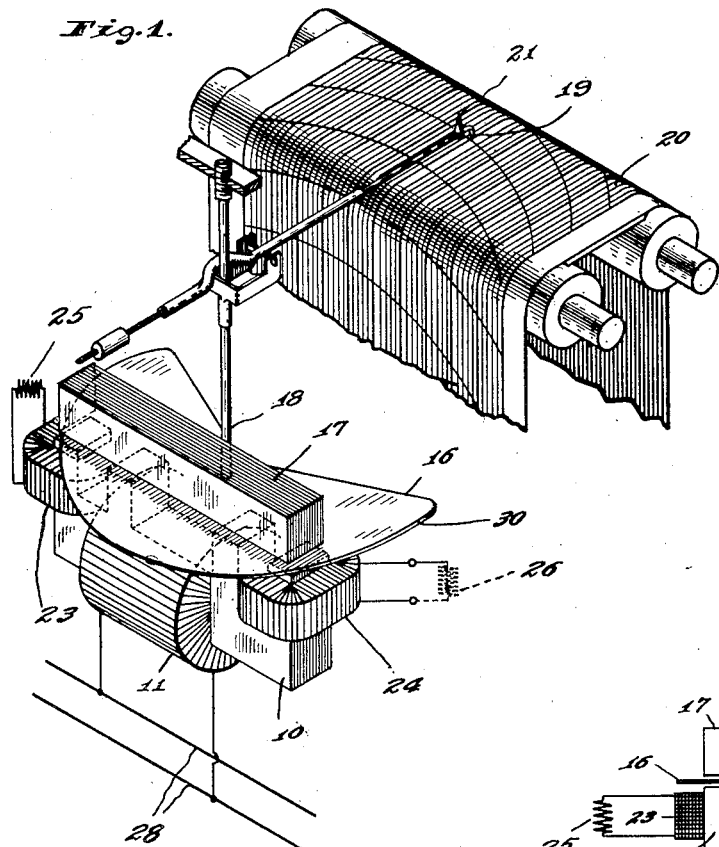

Aug. 26, 1924.  1,506,552

D. J. ANGUS

RESISTANCE METER

Filed May 14, 1921   2 Sheets-Sheet 1

Inventor
DONALD J. ANGUS,

By Hood & Schley
Attorneys

Aug. 26, 1924.

D. J. ANGUS 1,506,552

RESISTANCE METER

Filed May 14, 1921    2 Sheets-Sheet 2

Inventor
DONALD J. ANGUS,

By Hood & Jubly.
Attorneys

Patented Aug. 26, 1924.

1,506,552

UNITED STATES PATENT OFFICE.

DONALD J. ANGUS, OF INDIANAPOLIS, INDIANA.

RESISTANCE METER.

Application filed May 14, 1921. Serial No. 469,734.

*To all whom it may concern:*

Be it known that I, DONALD J. ANGUS, a citizen of the United States, residing at Indianapolis, in the county of Marion and State of Indiana, have invented a new and useful Resistance Meter, of which the following is a specification.

It is the object of my invention to measure electrical resistance directly, by a device operable by alternating currents and substantially independent of voltage and frequency and wave-form and giving a direct reading of the value of the resistance being measured.

In carrying out my invention in its preferred form, I produce electromagnetically two opposing pulls on an indicating or recording device, one of such pulls being dependent on and the other independent of a current passing through the resistance to be measured, and as either of such pulls predominates and produces a movement of the indicating or recording device I cause such movement to weaken relatively the predominating pull and strengthen relatively the other pull until equilibrium is obtained. If the instrument is properly calibrated, the position of the indicating or recording device now gives directly the value of the resistance being measured.

I obtain these opposing pulls, in the preferred form of my invention, by two opposing induction-meter elements, the secondary coil of one of which is arranged to have the resistance to be measured connected in circuit with it; these two induction-meter elements conveniently act on the same eddy-current plate though this is not essential, and tend to turn oppositely the eddy-current plate or plates; and the eddy-current plate or plates are so arranged, preferably by having the edge or edges cut away as shown, so that as either meter element predominates and produces movement of such plate or plates the conductance of the permissible path for eddy currents in the associated eddy-current plate is reduced, thus diminishing the pull of that induction-meter element, while at the same time the conductance of the permissible path for the eddy currents of the other induction-meter element is increased, to permit larger eddy currents, so that the pull from the last-named meter element is increased, until equilibrium is produced. I prefer to provide for the increase of the conductance of the eddy-current path of one induction-meter element at the same time that that of the other is decreased, though this is not essential, and it is sufficient if the conductance of the eddy-current path of only one of the meter elements is made to vary. In the preferred form of my invention the two meter elements are combined so that they may have a common main exciting winding, though this is not essential.

Figure 3:
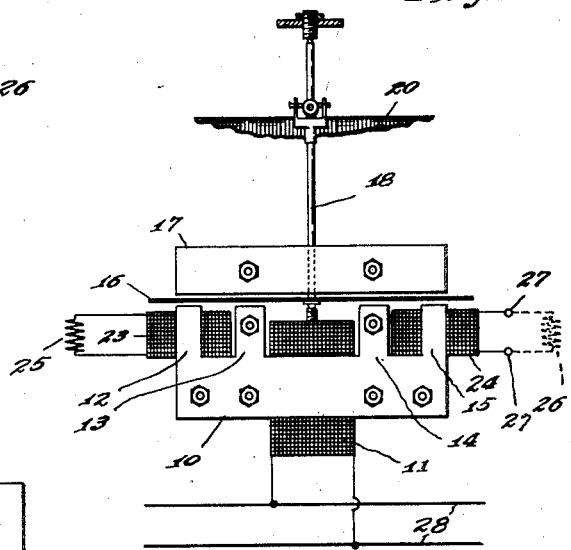
Figure 2:
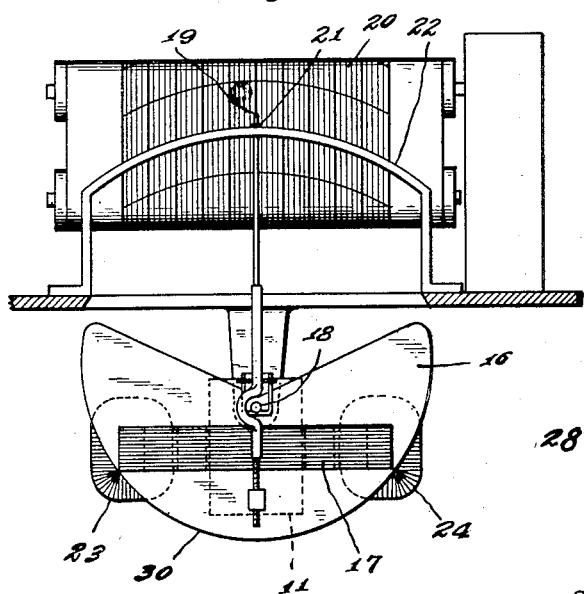
Figure 7:
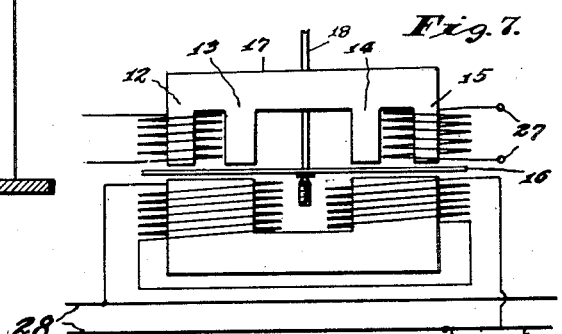
Figure 4:
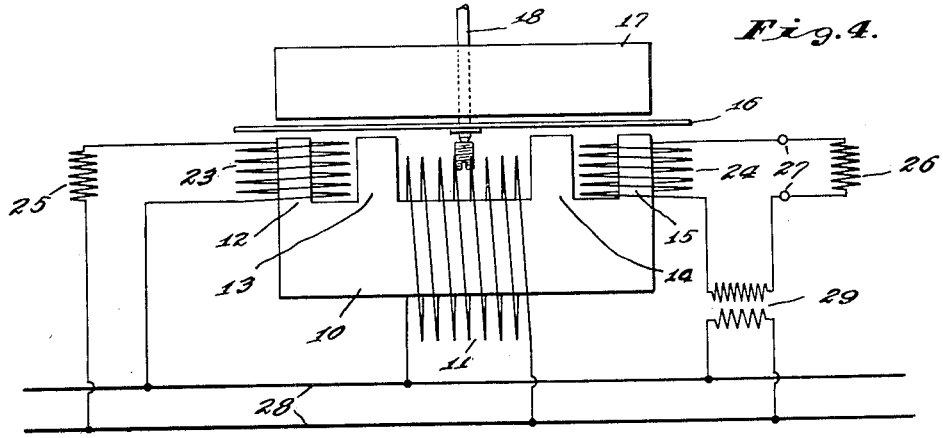
Figure 5:
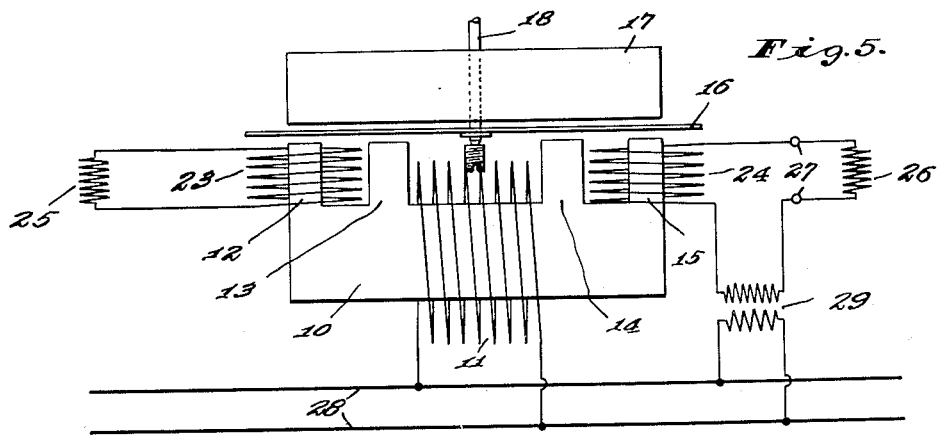
Figure 6:
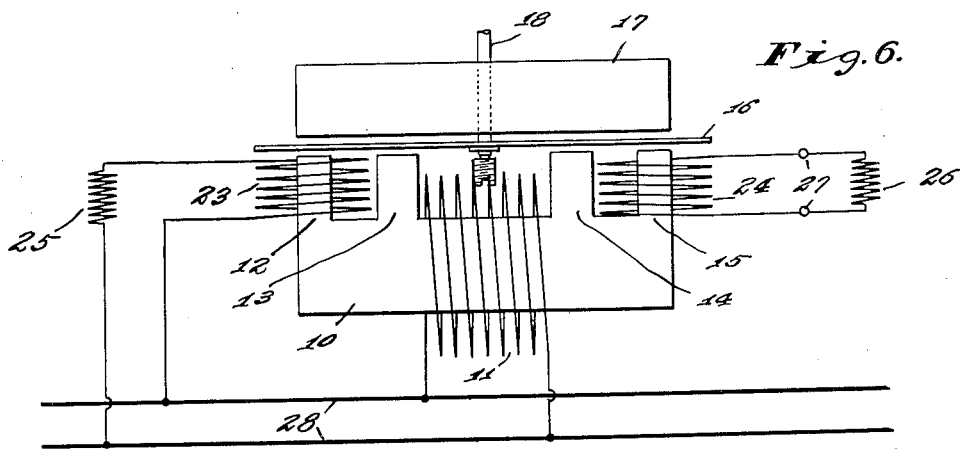

The accompanying drawings illustrate my invention: Fig. 1 is a fragmentary perspective view showing the elements of my resistance meter in a recording meter; Fig. 2 is a plan of the parts shown in Fig. 1; Fig. 3 is a diagrammatic vertical section through the parts shown in Fig. 1, indicating one set of connections for the instruments; Figs. 4, 5, and 6 are diagrammatic views, somewhat similar to Fig. 3, showing other arrangements of connections; and Fig. 7 is a diagram of a modification in which the secondary coils and the main exciting coil are on different members.

In the preferred form of my resistance meter, as shown in Figs. 1 to 6 inclusive, a laminated core 10 has a main exciting winding 11 around its intermediate portion, and two pairs of laterally projecting fingers, 12 and 13, and 14 and 15, from its respective ends, the free ends of all the fingers 12, 13, 14, and 15 conveniently being in the same plane. An eddy-current plate 16 lies close to the ends of the fingers 12, 13, 14, and 15, and on the opposite side of such plate is a laminated member 17 of magnetic material for completing the magnetic circuit. The eddy-current plate 16 is suitably mounted to oscillate, as by being fixed on a vertical shaft 18, which carries a suitable indicating or recording device, such as a pen 19 which cooperates with a moving chart 20 driven by the usual clock-work, and a pointer 21 movable in front of a suitable scale 22 for visual indication.

One of each pair of fingers 12 and 13, and 14 and 15, is provided with a secondary coil upon it, while the other is unwound; as shown, the finger 12 is provided with a secondary coil 23, and the finger 15 with a secondary coil 24, the fingers 13 and 14 being unwound. One of these secondary coils, say 23, is permanently connected in series with a resistance 25, of fixed value; while the other, say 24, may be connected in series with the resistance 26 the value of which is to be measured, conveniently being provided in its circuit with binding posts 27 for making such connection to different resistances. The secondary coils 23 and 24 may have their circuits completed through their respective resistances 25 and 26 alone, as indicated in Figs. 1 and 3; or they may be connected in series with such resistances across a suitable alternating-current exciting circuit 28, as is indicated in Fig. 4, the connection either being direct as indicated for the coil 23 or through a transformer 29 as indicated for the coil 24; or one of the secondary coils 23 and 24 may have its circuit completed through its associated resistance alone, while the other is connected to the exciting circuit in series with its associated resistance, as is indicated in Figs. 5 and 6. The main exciting winding 11 is connected across a suitable alternating-current exciting circuit 28, which will ordinarily be the same exciting circuit as that for the secondary coils 23 and 24 when the latter are connected to an exciting circuit, as shown in Figs. 4, 5, and 6.

The two pairs of fingers 12 and 13, and 14 and 15, are in effect two induction-meter elements, when considered in conjunction with the corresponding parts of the core 10 and the eddy-current plate and the member 17; and these two induction-meter elements are arranged to act oppositely on the eddy-current plate 16, so that the action of the fingers 12 and 13 tends to turn such plate in a clockwise direction (Figs. 1 and 2) and that of the fingers 14 and 15 tends to turn it in a counter-clockwise direction. To make this clear it will be sufficient to refer to the action of the fingers 12 and 13 in Fig. 3, the action of the other pair of fingers being similar. The excitation of the core 10 by the main winding 11 causes a main alternating flux to pass through the eddy-current plate 16 from the fingers 12 and 13 to the member 17, thus producing in such eddy-current plate eddy currents in approximate quadrature with such flux. Currents are induced in the secondary coil 23 by this same main flux, and these induced currents and the flux which they produce are in approximate quadrature with the main flux and so in phase with the eddy currents in the plate 16 at the finger 13. The path of this secondary flux is mainly from the finger 12 through the main body of the core 10 to the finger 13, and thence through the eddy-current plate 16 into the member 17 and back, thus in the main not passing through that part of the core 10 which carries the main winding 11. This secondary flux, being in phase with the eddy currents produced by the main flux in the plate 16 at the finger 13, reacts with such eddy currents, and tends to turn the eddy-current plate 16 in a clock-wise direction (Figs. 1 and 2). This secondary flux also induces its own eddy currents in the eddy-current plate 16, which latter eddy currents are in quadrature with the secondary flux, and so in phase with the main flux; and these eddy currents from the secondary flux react with the main flux to produce also a tendency to turn the plate 16 in a clockwise direction. Thus the two fluxes and the two sets of eddy currents cooperate to produce the same tendency to turn the eddy-current plate 16.

A similar action takes place at the other pair of fingers 14 and 15, save that there the tendency is to turn the eddy-current plate in the opposite direction.

The forces with which these turning tendencies act vary with the currents in the secondary coils 23 and 24. Such current is constant in the secondary coil 23, (assuming nothing else is changed), because the resistance 25 is a fixed resistance; but it varies in the secondary coil 24 in inverse sense to the value of the resistance 26. Thus the relation between the opposing turning forces on the eddy-current plate 16 varies as the resistance 26 is varied, causing one or the other of such forces to predominate. The force which thus predominates produces an actual movement of the eddy-current plate 16 in the corresponding direction, clockwise if the turning force from the fingers 12 and 13 predominates and counter-clockwise if that from the fingers 14 and 15 predominates.

This movement would be continued indefinitely, in the absence of something to stop it, if the eddy-current plate 16 were a disk of uniform conductance throughout. However, it is not of uniform conductance throughout. Thus variable conductance is obtained, as shown, by making the eddy-current plate not a disk, but providing it with an edge 30 which is eccentric with respect to the turning axis of the plate (the shaft 18); so that as the plate is turned in one direction by the predominance of the turning force produced by one pair of fingers the distance of the edge of the plate from the axis at such fingers diminishes, and thus in effect the edge of the plate moves inward relatively to the faces of the fingers which produce the predominating effect, and so cuts down the conductance of the possible path for the eddy currents in such plate at such fingers. By thus cutting down such conductance, the eddy currents themselves are also cut down, and by the cutting down of such eddy currents the turning force exerted on the plate is also cut down, so that the force which predominates to produce the movement of the eddy-current plate decreases as the movement it produces continues. The reverse effect takes place at the other pair of fingers, the movement of the eddy-current plate causing an increase in the radius of such plate at such fingers and thus increasing the conductance of the path for eddy currents, thereby increasing the eddy currents themselves, and thus increasing the opposing force which is produced at such fingers by the reaction of such eddy currents with the fluxes, and so causing an increase in the turning force exerted on the plate 16 at the pair of fingers which initially produced the smaller force. As a result of this decrease in the initially predominating force and this increase in the initially smaller force, the movement of the eddy-current plate eventually causes such two forces to become equal again, at a new position of equilibrium of the plate 16. Other things being equal, and the resistance 25 being constant, there will be a definite position of the plate 16, and therefore of the pen 19 and pointer 21, for each value of the resistance 26. By proper calibration of the instrument, it is thus possible to obtain a direct reading on the scale 22 and a direct indication on the chart 20 of the value of the resistance 26, and a continuous record on such chart of the changes in the value of such resistance if the resistance is a changeable one.

If instead of having the circuits of the secondary coils 23 and 24 closed on themselves through the resistances 25 and 26, either or both of such secondary coils is connected through its resistance to the exciting circuit, directly or through a transformer, as is indicated in Figs. 4, 5, and 6, the action is substantially the same. Because of the resistances 25 and 26 in such circuits, and the inductive character of the circuit including the coil 11, the fluxes which are produced by the currents in the secondary coils 23 and 24 are approximately in quadrature with the main flux produced by the main winding 11 even though such secondary coils 23 and 24 are connected to the exciting circuit, so that the interaction of the fluxes and eddy currents is substantially the same, qualitatively if not quantitatively, whether such secondary coils are excited conductively from the exciting circuit or are excited wholly by induction.

As shown in Fig. 7, the fingers 12 and 13, and 14 and 15, on one of each pair of which a secondary coil is provided, may be on the member 17 which completes the magnetic circuit, instead of on the member 10 which bears the main exciting winding.

The resistance meter may be used to give a direct indication and a direct record of the value of any resistance 26 which may be connected to the binding posts 27. Since the circuits of the two secondary coils are of the same nature, both such circuits being resistance circuits with relatively small inductance, the action of the meter is substantially unaffected by variations in the voltage, frequency, or wave-form of the exciting circuit, for any such variations similarly affect the two induction-meter elements.

It is not necessary that the edge 30 of the plate 16 be a smooth curve as shown, or even that it be eccentric. My invention is not limited to any particular shape of such edge 30 but contemplates any position, shape, or construction of the plate 16 so that as such plate is moved a variation is produced in the conductance of the eddy-current paths in such plate. This variation is preferably provided for at both pairs of fingers, to produce an increase in the eddy currents at one pair of fingers and a simultaneous decrease in those at the other pair of fingers; but it is obvious that this double action is not necessary, and that equilibrium between the opposing forces may be obtained if the eddy currents at only one set of fingers are varied. It is not essential that the two pairs of fingers, constituting separate induction-meter elements, shall be excited by a common exciting winding, or shall act on the same eddy-current plate, or shall have their magnetic circuits completed through the same magnetic-material member 17, though I now prefer to provide these things in common, as that seems to be the simplest and most convenient arrangement; nor is it material whether the fingers and the secondary coils therefor be on the same member 10 which carries the main exciting winding 11 or on the member 17, as the fingers may be provided at any convenient part of the magnetic circuit energized by the coil 11 if in proper relation to the eddy-current plate or plates.

I claim as my invention:

1. An alternating-current resistance meter, comprising two induction-meter elements, and a movable member including one or more eddy-current plates which cooperate with said two induction-meter elements, said two induction-meter elements respectively tending to move said movable element in opposite directions, and one of said meter elements being provided with a winding with which the resistance to be measured may be connected in circuit, said eddy-current plate or plates being arranged to have the conductance of the possible path for eddy currents therein varied as said movable element is moved.

2. An alternating-current resistance meter, comprising two pairs of fingers, main exciting means for producing alternating fluxes in such fingers, a secondary coil on one finger of each pair, a resistance connected in circuit with one of said secondary coils, the other secondary coil being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means associated with at least one of said pairs of fingers being arranged to decrease the conductance of the eddy-current path when the effect of that pair of fingers predominates and vice versa.

3. An alternating-current resistance meter, comprising two pairs of fingers, main exciting means for producing alternating fluxes in such fingers, a secondary coil on one finger of each pair, a resistance connected in circuit with one of said secondary coils, the other secondary coil being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means being arranged to vary the relative conductances of the eddy-current paths at the two sets of fingers as said movable member is moved.

4. An alternating-current resistance meter, comprising a core having two pairs of fingers, a main exciting winding for said core, a secondary coil on one finger of each pair, a resistance permanently in circuit with one of said secondary coils, the other secondary coil being arranged to have connected in circuit with it the resistance of which the value is to be measured, and a movably mounted eddy-current plate in juxtaposition to both said pairs of fingers, the two pairs of fingers being arranged so their respective reactions on such plate tend to move it in opposite directions, and the edge of such eddy-current plate being arranged to approach or recede from at least one of said pairs of fingers as the eddy-current plate is moved and thus to vary the conductance of the path for the eddy currents in such plate at such fingers.

5. An alternating-current resistance meter, comprising two pairs of fingers, main exciting means for producing alternating fluxes in such fingers, a secondary coil on one finger of each pair, one of said secondary coils being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means associated with at least one of said pairs of fingers being arranged to decrease the conductance of the eddy-current path when the effect of that pair of fingers predominates and vice versa.

6. An alternating-current resistance meter, comprising two pairs of fingers, main exciting means for producing alternating fluxes in such fingers, a secondary coil on one finger of each pair, one of said secondary coils being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means being arranged to vary the relative conductances of the eddy-current paths at the two sets of fingers as said movable member is moved.

7. An alternating-current resistance meter, comprising a core having two pairs of fingers, a main exciting winding for said core, a secondary coil on one finger of each pair, one of said secondary coils being arranged to have connected in circuit with it the resistance of which the value is to be measured, and a movably mounted eddy-current plate in juxtaposition to both said pairs of fingers, the two pairs of fingers being arranged so their respective reactions on such plate tend to move it in opposite directions, and the edge of such eddy-current plate being arranged to approach or recede from at least one of said pairs of fingers as the eddy-current plate is moved and thus to vary the conductance of the path for the eddy currents in such plate at such fingers.

8. An alternating-current resistance meter, comprising an induction-meter element provided with a winding with which the resistance to be measured may be connected in circuit, an eddy-current plate cooperating with said induction-meter element and movably mounted so that as it is moved by the interaction thereon of said induction-meter element the possible path for eddy currents therein is varied in conductance, and electromagnetic means opposing the movement of said movable member under the action of said induction-meter element.

9. An alternating-current resistance meter, comprising a pair of fingers, main exciting means for producing alternating fluxes in such fingers, a secondary coil on one of said fingers, said secondary coil being arranged to have connected in circuit therewith the resistance of which the value is to be measured, a movable member having an eddy-current plate cooperating with said two fingers so that the reaction produced tends to move said movable member in one direction, electromagnetic means opposing such movement of said movable member, said eddy-current plate being arranged to decrease the conductance of the eddy-current path in such plate as such plate is moved by the interaction thereon of the fluxes from said fingers.

10. An alternating-current resistance meter, comprising a core having a pair of fingers, a main exciting winding for said core, a secondary coil on one of said fingers, said secondary coil being arranged to have connected in circuit with it the resistance of which the value is to be measured, a movably mounted eddy-current plate in juxtaposition to said fingers so that the reaction of said fingers on said plate tends to move the plate in a given direction, electromagnetic means opposing such movement of said movable member, the edge of said eddy-current plate being arranged to approach or recede from such fingers as the eddy-current plate is moved and thus to vary the conductance of the path for the eddy currents in such plate at such fingers.

11. An alternating-current resistance meter, comprising two pairs of fingers, main exciting means for producing alternating fluxes in such fingers, a secondary coil on one finger of each pair, one of said secondary coils being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means associated with at least one of said pairs of fingers being arranged to decrease the conductance of the eddy-current path when the effect of that pair of fingers predominates and vice versa, and the circuits of said two secondary coils being of the same nature.

12. An alternating-current resistance meter, comprising two pairs of fingers, main exciting means for producing alternating fluxes in such fingers, a secondary coil on one finger of each pair, one of said secondary coils being arranged to have connected in circuit therewith the resistance of which the value is to be measured, and a movable member having eddy-current-carrying means cooperating with both pairs of fingers so that the reactions produced by the two pairs of fingers tend to move said movable member in opposite directions respectively, said eddy-current-carrying means being arranged to vary the relative conductances of the eddy-current paths at the two sets of fingers as said movable member is moved, and the circuits of said two secondary coils being of the same nature.

13. An alternating-current resistance meter, comprising a core having two pairs of fingers, a main exciting winding for said core, a secondary coil on one finger of each pair, one of said secondary coils being arranged to have connected in circuit with it the resistance of which the value is to be measured, and a movably mounted eddy-current plate in juxtaposition to both said pairs of fingers, the two pairs of fingers being arranged so their respective reactions on such plate tend to move it in opposite directions, and the edge of such eddy-current plate being arranged to approach or recede from at least one of said pairs of fingers as the eddy-current plate is moved and thus to vary the conductance of the path for the eddy currents in such plate at such fingers, and the circuits of said two secondary coils being of the same nature.

14. An alternating-current resistance meter, comprising two induction-meter elements, and a movable member including one or more eddy-current plates which cooperate with said two induction-meter elements, said two induction-meter elements respectively tending to move said movable element in opposite directions, each of said two induction-meter elements being provided with a winding, and said respective windings for the two induction-meter elements being similar in nature, and one of said windings being arranged to have the resistance to be measured connected in circuit with it, and said eddy-current plate or plates being arranged to have the conductance of the possible path for eddy currents therein varied as said movable element is moved.

15. An alternating-current resistance meter, comprising two induction-meter elements, and a movable member including one or more eddy-current plates which cooperate with said two induction-meter elements, said two induction-meter elements respectively tending to move said movable element in opposite directions, each of said two induction-meter elements being provided with a winding, and said respective windings for the two induction-meter elements being similar in nature and so connected to an alternating-current circuit that they are similarly variable in effect upon change in voltage of such alternating-current circuit.

16. An alternating-current resistance meter, comprising a pair of fingers, main exciting means for producing alternating fluxes in such fingers, a secondary coil on one of said fingers, said secondary coil being arranged to have connected in circuit therewith the resistance of which the value is to be measured, a movable member having an eddy-current plate cooperating with said two fingers so that the reaction produced tends to move said movable member in one direction, means opposing such movement of said movable member, said eddy-current plate being arranged to decrease the conductance of the eddy-current path in such plate as such plate is moved by the interaction thereon of the fluxes from said fingers.

17. An alternating-current resistance meter, comprising a core having a pair of fingers, a main exciting winding for said core, a secondary coil on one of said fingers, said secondary coil being arranged to have connected in circuit with it the resistance of which the value is to be measured, a movably mounted eddy-current plate in juxtaposition to said fingers so that the reaction of said fingers on said plate tends to move the plate in a given direction, means opposing such movement of said movable member, the edge of said eddy-current plate being arranged to approach or recede from such fingers as the eddy-current plate is moved and thus to vary the conductance of the path for the eddy currents in such plate at such fingers.

18. An alternating-current resistance meter, comprising two induction-meter elements, and a movable member including one or more eddy-current plates which co-operate with and are transverse to the flux of said two induction-meter elements, said two induction-meter elements respectively tending to move said movable element in opposite directions, and one of said induction-meter elements being provided with a winding with which the resistance to be measured may be connected in circuit, said eddy-current plate or plates being arranged to have the conductance of the possible path for eddy currents therein varied as said movable element is moved.

19. An alternating-current resistance meter, comprising an induction-meter element provided with a winding with which the resistance to be measured may be connected in circuit, an eddy-current plate transverse to the flux of and co-operating with said induction-meter element and movably mounted so that as it is moved by the action thereon of said induction-meter element the possible path for eddy currents therein is varied in conductance, and electromagnetic means opposing the movement of said movable member under the action of said induction-meter element.

20. An alternating-current resistance meter, comprising two induction-meter elements, and a movable member including one or more eddy-current plates which co-operate with and are transverse to the flux of said two induction-meter elements, said two induction-meter elements respectively tending to move said movable element in opposite direction, each of said two induction-meter elements being provided with a winding, said respective windings for the two induction-meter elements being similar in nature and one of said windings being arranged to have the resistance to be measured connected in circuit with it, and said eddy-current plate or plates being arranged to have the conductance of the possible path for eddy currents therein varied as said movable element is moved.

In witness whereof, I have hereunto set my hand at Indianapolis, Indiana, this 11th day of May, A. D. one thousand nine hundred and twenty one.

DONALD J. ANGUS.